(12) United States Patent
Archer et al.

(10) Patent No.: US 9,250,948 B2
(45) Date of Patent: *Feb. 2, 2016

(54) ESTABLISHING A GROUP OF ENDPOINTS IN A PARALLEL COMPUTER

(75) Inventors: Charles J. Archer, Rochester, MN (US); Michael A. Blocksome, Rochester, MN (US); Joseph D. Ratterman, Rochester, MN (US); Brian E. Smith, Rochester, MN (US); Hanhong Xue, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 19 days.

This patent is subject to a terminal disclaimer.

(21) Appl. No.: 13/231,326

(22) Filed: Sep. 13, 2011

(65) Prior Publication Data

US 2013/0067479 A1    Mar. 14, 2013

(51) Int. Cl.
  *G06F 9/46* (2006.01)
  *G06F 9/54* (2006.01)

(52) U.S. Cl.
  CPC . *G06F 9/46* (2013.01); *G06F 9/546* (2013.01)

(58) Field of Classification Search
  CPC .................................. G06F 9/46; G06F 9/546
  See application file for complete search history.

(56) References Cited

U.S. PATENT DOCUMENTS

| | | | |
|---|---|---|---|
| 4,860,201 A | 8/1989 | Stolfo et al. |
| 4,910,669 A | 3/1990 | Gorin et al. |
| 5,050,162 A | 9/1991 | Golestani |
| 5,063,562 A | 11/1991 | Barzilai et al. |
| 5,095,444 A | 3/1992 | Motles |
| 5,218,676 A | 6/1993 | Ben-Ayed et al. |
| 5,347,450 A | 9/1994 | Nugent |
| 5,414,839 A | 5/1995 | Joshi |
| 5,446,676 A | 8/1995 | Huang et al. |
| 5,491,691 A | 2/1996 | Shtayer et al. |
| 5,651,099 A | 7/1997 | Konsella |
| 5,815,793 A | 9/1998 | Ferguson |
| 5,826,262 A | 10/1998 | Bui et al. |
| 5,826,265 A | 10/1998 | Van Huben et al. |

(Continued)

OTHER PUBLICATIONS

Blaise Barney, "Message Passing Interface (MPI)", Jul. 21, 2011, Lawrence Livermore National Laboratory, <http://web.archive.org/web/20110721045616/https://computing.llnl.gov/tutorials/mpi/>.*

(Continued)

*Primary Examiner* — Mengyao Zhe
*Assistant Examiner* — James J Lee
(74) *Attorney, Agent, or Firm* — Edward J. Lenart; Grant A. Johnson; Kennedy Lenart Spraggins LLP

(57) ABSTRACT

A parallel computer executes a number of tasks, each task includes a number of endpoints and the endpoints are configured to support collective operations. In such a parallel computer, establishing a group of endpoints receiving a user specification of a set of endpoints included in a global collection of endpoints, where the user specification defines the set in accordance with a predefined virtual representation of the endpoints, the predefined virtual representation is a data structure setting forth an organization of tasks and endpoints included in the global collection of endpoints and the user specification defines the set of endpoints without a user specification of a particular endpoint; and defining a group of endpoints in dependence upon the predefined virtual representation of the endpoints and the user specification.

13 Claims, 7 Drawing Sheets

(56) References Cited

U.S. PATENT DOCUMENTS

| | | |
|---|---|---|
| 5,835,482 A | 11/1998 | Allen |
| 5,859,981 A | 1/1999 | Levin et al. |
| 5,862,381 A | 1/1999 | Advani et al. |
| 5,875,190 A | 2/1999 | Law |
| 5,912,893 A | 6/1999 | Rolfe et al. |
| 5,915,099 A | 6/1999 | Takata et al. |
| 5,918,020 A | 6/1999 | Blackard et al. |
| 5,933,425 A | 8/1999 | Iwata |
| 5,937,201 A | 8/1999 | Matsushita et al. |
| 5,953,336 A | 9/1999 | Moore et al. |
| 5,982,771 A | 11/1999 | Caldara et al. |
| 5,995,503 A | 11/1999 | Crawley et al. |
| 5,999,734 A | 12/1999 | Willis et al. |
| 6,006,032 A | 12/1999 | Blandy et al. |
| 6,047,122 A | 4/2000 | Spiller |
| 6,057,839 A | 5/2000 | Advani et al. |
| 6,101,495 A | 8/2000 | Tsuchida et al. |
| 6,115,357 A | 9/2000 | Packer et al. |
| 6,118,777 A | 9/2000 | Sylvain |
| 6,126,331 A | 10/2000 | Komatsu et al. |
| 6,167,490 A | 12/2000 | Levy et al. |
| 6,182,183 B1 | 1/2001 | Wingard et al. |
| 6,253,372 B1 | 6/2001 | Komatsu et al. |
| 6,336,143 B1 | 1/2002 | Diedrich et al. |
| 6,343,339 B1 | 1/2002 | Daynes |
| 6,438,702 B1 | 8/2002 | Hodge |
| 6,490,566 B1 | 12/2002 | Schmidt |
| 6,493,637 B1 | 12/2002 | Steeg |
| 6,563,823 B1 | 5/2003 | Przygienda et al. |
| 6,594,805 B1 | 7/2003 | Tetelbaum et al. |
| 6,600,721 B2 | 7/2003 | Edholm |
| 6,601,098 B1 | 7/2003 | Case et al. |
| 6,633,937 B2 | 10/2003 | Thomson |
| 6,687,247 B1 | 2/2004 | Wilford et al. |
| 6,725,313 B1 | 4/2004 | Wingard et al. |
| 6,742,044 B1 | 5/2004 | Aviani et al. |
| 6,748,413 B1 | 6/2004 | Bournas |
| 6,772,255 B2 | 8/2004 | Daynes |
| 6,775,703 B1 | 8/2004 | Burns et al. |
| 6,836,480 B2 | 12/2004 | Basso et al. |
| 6,839,768 B2 | 1/2005 | Ma et al. |
| 6,839,829 B1 | 1/2005 | Daruwalla et al. |
| 6,894,974 B1 | 5/2005 | Aweva et al. |
| 6,901,052 B2 | 5/2005 | Buskirk et al. |
| 6,952,692 B1 | 10/2005 | Bhattiprolu et al. |
| 6,990,529 B2 | 1/2006 | Yang et al. |
| 7,032,224 B2 | 4/2006 | Kadakia et al. |
| 7,120,712 B2 | 10/2006 | Wingard et al. |
| 7,197,577 B2 | 3/2007 | Nellitheertha |
| 7,216,217 B2 | 5/2007 | Hansen et al. |
| 7,286,471 B2 | 10/2007 | Kloth et al. |
| 7,299,155 B2 | 11/2007 | Ebert et al. |
| 7,301,541 B2 | 11/2007 | Hansen et al. |
| 7,395,536 B2 * | 7/2008 | Verbeke ............... G06F 9/5055 709/200 |
| 7,466,652 B2 | 12/2008 | Lau et al. |
| 7,478,138 B2 | 1/2009 | Chang et al. |
| 7,480,298 B2 | 1/2009 | Blackmore et al. |
| 7,480,609 B1 | 1/2009 | Cavanagh et al. |
| 7,509,244 B1 | 3/2009 | Shakeri et al. |
| 7,527,558 B2 | 5/2009 | Lavoie et al. |
| 7,539,209 B2 | 5/2009 | Pelley |
| 7,647,441 B2 | 1/2010 | Wingard et al. |
| 7,684,332 B2 | 3/2010 | Ray et al. |
| 7,738,443 B2 | 6/2010 | Kumar |
| 7,743,382 B2 | 6/2010 | Schumacher et al. |
| 7,813,369 B2 | 10/2010 | Blackmore et al. |
| 7,913,369 B2 | 3/2011 | Gakovic |
| 7,953,085 B2 | 5/2011 | Chang et al. |
| 7,958,183 B2 | 6/2011 | Arimilli et al. |
| 8,041,969 B2 | 10/2011 | Archer et al. |
| 8,055,879 B2 | 11/2011 | Archer et al. |
| 8,087,025 B1 | 12/2011 | Graupner |
| 8,195,152 B1 | 6/2012 | Edwards |
| 8,565,120 B2 | 10/2013 | Acher et al. |
| 2001/0047458 A1 | 11/2001 | Iizuka |
| 2002/0062459 A1 | 5/2002 | Lasserre et al. |
| 2002/0065930 A1 | 5/2002 | Rhodes |
| 2002/0194392 A1 | 12/2002 | Cheng et al. |
| 2003/0004699 A1 | 1/2003 | Choi et al. |
| 2003/0021287 A1 | 1/2003 | Lee et al. |
| 2003/0074142 A1 | 4/2003 | Steeg |
| 2003/0093254 A1 | 5/2003 | Frankel et al. |
| 2003/0093255 A1 | 5/2003 | Freyensee et al. |
| 2004/0001508 A1 | 1/2004 | Zheng et al. |
| 2004/0015494 A1 | 1/2004 | Basso et al. |
| 2004/0098373 A1 | 5/2004 | Bayliss et al. |
| 2004/0107240 A1 | 6/2004 | Zabarski et al. |
| 2004/0111398 A1 | 6/2004 | England et al. |
| 2004/0246897 A1 | 12/2004 | Ma et al. |
| 2004/0255002 A1 | 12/2004 | Kota et al. |
| 2005/0053034 A1 | 3/2005 | Chiueh |
| 2005/0138161 A1 | 6/2005 | McDaniel et al. |
| 2005/0182834 A1 | 8/2005 | Black |
| 2005/0278453 A1 | 12/2005 | Cherkasova |
| 2006/0002424 A1 | 1/2006 | Gadde |
| 2006/0018283 A1 | 1/2006 | Lewis et al. |
| 2006/0059196 A1 | 3/2006 | Sato et al. |
| 2006/0075067 A1 | 4/2006 | Blackmore et al. |
| 2006/0203739 A1 | 9/2006 | Padmanabhan et al. |
| 2006/0292292 A1 | 12/2006 | Brightman et al. |
| 2007/0014316 A1 | 1/2007 | Ryu et al. |
| 2007/0016589 A1 | 1/2007 | Hara et al. |
| 2007/0094429 A1 | 4/2007 | Wingard et al. |
| 2007/0121511 A1 | 5/2007 | Morandin |
| 2007/0179760 A1 | 8/2007 | Smith |
| 2007/0260746 A1 | 11/2007 | Mirtorabi et al. |
| 2007/0294426 A1 | 12/2007 | Huang et al. |
| 2008/0016249 A1 | 1/2008 | Ellis et al. |
| 2008/0109569 A1 | 5/2008 | Leonard et al. |
| 2008/0126739 A1 | 5/2008 | Archer et al. |
| 2008/0168177 A1 | 7/2008 | Subramaniam |
| 2008/0240115 A1 | 10/2008 | Briscoe et al. |
| 2008/0248747 A1 | 10/2008 | Buckley |
| 2008/0306721 A1 | 12/2008 | Yang |
| 2008/0310350 A1 * | 12/2008 | Dykema et al. ............... 370/328 |
| 2008/0313376 A1 | 12/2008 | Archer et al. |
| 2008/0313661 A1 | 12/2008 | Blocksome et al. |
| 2009/0003344 A1 | 1/2009 | Kumar |
| 2009/0006808 A1 | 1/2009 | Blumrich et al. |
| 2009/0006810 A1 | 1/2009 | Almasi et al. |
| 2009/0037707 A1 | 2/2009 | Blocksome |
| 2009/0043988 A1 | 2/2009 | Archer et al. |
| 2009/0067334 A1 * | 3/2009 | Archer et al. ............... 370/238 |
| 2009/0089328 A1 | 4/2009 | Miller |
| 2009/0092075 A1 | 4/2009 | Corson et al. |
| 2009/0113308 A1 | 4/2009 | Almasi et al. |
| 2009/0125604 A1 | 5/2009 | Chang et al. |
| 2009/0129277 A1 | 5/2009 | Supalov et al. |
| 2009/0138892 A1 | 5/2009 | Almasi et al. |
| 2009/0196282 A1 | 8/2009 | Fellman et al. |
| 2009/0201832 A1 | 8/2009 | Brown |
| 2009/0300154 A1 | 12/2009 | Branson et al. |
| 2010/0005189 A1 | 1/2010 | Archer et al. |
| 2010/0017492 A1 | 1/2010 | Reistad |
| 2010/0023631 A1 | 1/2010 | Archer et al. |
| 2010/0037035 A1 | 2/2010 | Archer et al. |
| 2010/0058313 A1 | 3/2010 | Hansmann et al. |
| 2010/0241774 A1 | 9/2010 | Olszewski et al. |
| 2010/0274872 A1 | 10/2010 | Harrang et al. |
| 2010/0287320 A1 | 11/2010 | Querol et al. |
| 2011/0113083 A1 | 5/2011 | Shahar |
| 2011/0238949 A1 | 9/2011 | Archer et al. |
| 2011/0258627 A1 | 10/2011 | Faraj et al. |
| 2012/0030370 A1 | 2/2012 | Faraj et al. |
| 2012/0174105 A1 | 7/2012 | Archer et al. |
| 2012/0185230 A1 | 7/2012 | Archer et al. |
| 2012/0185867 A1 | 7/2012 | Archer et al. |
| 2012/0185873 A1 | 7/2012 | Archer et al. |
| 2012/0210094 A1 | 8/2012 | Blocksome et al. |
| 2012/0246256 A1 | 9/2012 | Blocksome et al. |
| 2013/0024866 A1 | 1/2013 | Archer et al. |
| 2013/0046844 A1 | 2/2013 | Faraj et al. |
| 2013/0060557 A1 | 3/2013 | Archer et al. |

(56) References Cited

U.S. PATENT DOCUMENTS

| | | |
|---|---|---|
| 2013/0060833 A1 | 3/2013 | Archer et al. |
| 2013/0061238 A1 | 3/2013 | Archer et al. |
| 2013/0067479 A1 | 3/2013 | Archer et al. |
| 2013/0067483 A1 | 3/2013 | Archer et al. |
| 2013/0067487 A1 | 3/2013 | Faraj et al. |
| 2013/0111482 A1 | 5/2013 | Archer et al. |
| 2013/0124665 A1 | 5/2013 | Blocksome et al. |
| 2013/0160025 A1 | 6/2013 | Faraj et al. |
| 2013/0179620 A1 | 7/2013 | Faraj et al. |

OTHER PUBLICATIONS

"DeinoMPI—MPI_Comm_split", May 11, 2011, Deino Software, <http://web.archive.org/web/20110501135905/http://mpi.deino.net/mpi_functions/MPI_Comm_split.html>.*

Gropp1, "Tutorial on MPI: The Message-Passing Interface", Argonne National Laboratory, Apr. 23, 2009, URL: https://web.archive.org/web/20090423041649/http://www.mcs.anl.gov/research/projects/mpi/tutorial/gropp/node82.html.*

Gropp2, "Tutorial on MPI: The Message-Passing Interface", Argonne National Laboratory, Apr. 23, 2009, URL: https://web.archive.org/web/20090423035309/http://www.mcs.anl.gov/research/projects/mpi/tutorial/gropp/node81.html.*

Weed, "Message Passing Programming with MPI—Overview and Function Description", Mississippi State University, Jul. 1999, 124 pages.*

Notice of Allowance, U.S. Appl. No. 12/189,336, Mar. 27, 2013.

Office Action, U.S. Appl. No. 13/006,696, Mar. 4, 2013.

Final Office Action, U.S. Appl. No. 13/007,905, Apr. 17, 2013.

Final Office Action, U.S. Appl. No. 12/985,075, Apr. 18, 2013.

Final Office Action, U.S. Appl. No. 13/667,456, Apr. 19, 2013.

U.S. Appl. No. 08/087,025, filed Dec. 2011, Graupner, Sven.

Office Action, U.S. Appl. No. 12/189,336, Sep. 13, 2012.

Office Action, U.S. Appl. No. 12/748,579, Sep. 19, 2012.

Notice of Allowance, U.S. Appl. No. 12/847,573, Jan. 11, 2012.

Office Action, U.S. Appl. No. 13/007,905, Dec. 28, 2012.

Office Action, U.S. Appl. No. 12/985,075, Nov. 7, 2012.

Office Action, U.S. Appl. No. 13/667,456, Jan. 2, 2013.

Willis, "MinSim: Optimized, Compiled VHDL Simulation Using Networked & Parallel Computers", 1993, Proceedings of Fall 1993 VHDL International User's Forumn, pp. 197-144.

Final Office Action, U.S. Appl. No. 11/924,934, Jan. 6, 2012.

Advisory Action, U.S. Appl. No. 11/865,981, Oct. 14, 2011.

Advisory Action, U.S. Appl. No. 11/764,333, Nov. 28, 2011.

Notice of Allowance, U.S. Appl. No. 11/832,192, Aug. 11, 2011.

Office Action, U.S. Appl. No. 12/189,336, Dec. 9, 2011.

Blaise Barney, "Message Passing Interface (MPA)", Jul. 21, 2011, Lawrence Livermore National Laboratory, web.archive.org/web/20110721045616/https://computing.llnl.gov/tutorials/mpl/>.

"DeinoMPI—MPI_Comm_split", May 11, 2011, Deino Software, web.archive.org/web/20110501135905?http://mpi.deino.net/mpi_functions/MPI_Comm_split.html>.

Office Action, U.S. Appl. No. 13/185,856, May 23, 2013, pp. 1-14.

Final Office Action, U.S. Appl. No. 12/748,579, May 10, 2013, pp. 1-7.

Notice of Allowance, U.S. Appl. No. 12/985,075, Jun. 12, 2013, pp. 1-14.

Office Action, U.S. Appl. No. 13/231,326, Jun. 6, 2013, pp. 1-57.

Office Action, U.S. Appl. No. 13/690,474, Jun. 25, 2013.

Wattenhofer, "Principles of Distributed Computing", Apr. 2005, 5 pages, Distributed Computing Group, Zurich.

Wikipedia, "Graphical user interface", Mar. 2007, 5 pages, Wikipedia.org (online publication), URL: en.wikipedia.org/wiki/Graphical_user_interface.

Vadhiyar et al., "Performance Modeling for Self Adapting Collective Communications for MPI", Los Alamos Computer Science Institute (LACSI) Symposium, Oct. 2001, 15 pages, LACSI, Rice University, Houston TX.

Final Office Action, U.S. Appl. No. 11/924,934, May 22, 2014, pp. 1-20.

Notice of Allowance, U.S. Appl. No. 13/663,545, Jul. 16, 2014, pp. 1-22.

Gropp1, "Tutorial on MPI: The Message-Passing Interface", Argonne National Laboratory, Apr. 23, 2009, URL: https://web.archive.org/web/20090423041649/http://www. mcs. anl.gov/research/projects/mpi/tutorial/gropp/node82.html.

Gropp2, "Tutorial on MPI: The Message-Passing Interface", Argonne National Laboratory, Apr. 23 2009, URL: https://web.archive.org/web/20090423035309/http:/ /www.mcs. anl.gov/research/projects/mpi/tutorial/gropp/node81.html.

"MPI-2: Extensions to the Message-Passing Interface," Message Passing Interface Forum, Nov. 15, 2003, mpi-forum.cs.uiuc.edu/docs/mpi2-report.pdf, Accessed Nov. 7, 2013, 370 Pages.

"MPI Performance Topics", computing.llnl.gov/tutorials/mpi_performance/, Accessed Jul. 8, 2011, 20 Pages.

Saphir, W., "Message Buffering and its Effect on the Communication Performance of Parallel Computers", Apr. 1994, citeseerx.ist.psu.edu/viewdoc/download?doi=10.1.1.128.5359&rep=rep1&type=pdf, pp. 1-20.

"Derived Datatypes with MPI", static.msi.umn.edu/tutorial/scicomp/general/MPI/content6.html, Accessed Jul. 11, 2011, 10 Pages.

Willis, J., et al., "MinSim: Optimized, Compiled VHDL Simulation Using Networked & Parallel Computers", Proceedings of Fall 1993 VHDL International User's Forum, Fall 1993, eda.org/VIUF_proc/Fall93/abstract_fall93.html#WILLIS93A, Accessed Nov. 7, 2013, pp. 137-144.

Almasi, G., et al. "Optimization of MPICollective Communication on BlueGene/L Systems", ICS'05, Jun. 20-22, 2005, pp. 253-262, ACM, Boston, MA, USA.

Chan, E., et al. "Collective Communication on Architectures that Support Simultaneous Communication over Multiple links", PPoPP'06, Mar. 29-31, 2006, pp. 2-11, ACM, New York, New York, USA.

Huang, S., et al., "DZB: MPI One-sided Exploitation of LAPI APIs Component Design", Communication Protocols & Application Tools Development, Mar. 16, 2006, pp. 1-70, IBM Corporation Poughkeepsie, NY, USA.

Weizhen, M. et al., "One-To-All Personalized Communication in Torus Networks", PDCn'07 Proceedings of the 25th IASTED International Multi-Conference: parallel and distributed computing and networks, Innsbruck, Austria,Year: 2007 (Month Unknown), pp. 291-296, ACTA Press Anaheim, CA, USA.

Sottile, M., et al., "Performance analysis of parallel programs via message-passing graph traversal", Feb. 25, 2006, Proc. 20th IEEE Int'l Parallel and Distributed Processing Symp. (IPDPS), Conference Date: Apr. 25-29, 2006, pp. 1-29, Los Alamos Nat. Lab., NM, USA. URL:smartech.gatech.edu/bitstream/handle/1853/14424/GT-CSE-06-10.pdf.

Stankovic, N., et al., "Visual Programming for Message-Passing Systems", International Journal of Software Engineering and Knowledge Engineering, (1999), (Month Unknown), 25 Pages, vol. 9, URL:citeseerx.ist.psu.edu/viewdoc/summary?doi=10.1.1.18.4673.

"DeinoMPI—MPI_Comm_split", May 11, 2011, Deino Software, web.archive.org/web/20110501135905/http://mpi.deino.net/mpi_functions/MPI_Comm_split.html, Accessed May 30, 2013, 4 Pages.

Barney, B., "Message Passing Interface (MPI)", Jul. 21, 2011, Lawrence Livermore National Laboratory, web.archive.org/web/20110721045616/https://comouting.linl.gov/tutorials/mpi/, Accessed Laboratory, Nov. 7, 2013, 31 Pages.

Faraj, A., et al., "STAR-MPI: Self Tuned Adaptive Routines for MPI Collective Operations", Proceedings of the 20th Annual International Conference on Supercomputing (ICS'06), Jun. 2006, pp. 199-208, ACM, New York, New York, USA, DOI: 10.1145/1183401.1183431.

Ribler, R., et al., "The Autopilot performance-directed adaptive control system," Future Generations Computer Systems, Sep. 1, 2001, pp. 175-187, vol. 18, No. 1, Elsevier Science Publications, Amsterdam, NL.

Zhang, Y., et al., "Automatic Performance Tuning for J2EE Application Server Systems," Lecture Notes in Computer Science, Year: 2005, (Month Unknown), pp. 520-527, vol. 3806, Springer Berlin Heidelberg.

(56) References Cited

OTHER PUBLICATIONS

Chung, I-Hsin, et al., "Automated Cluster-Based Web Service Performance Tuning," Proceedings of the 13th IEEE International Symposium on High Performance Distributed Computing, 2004, Honolulu, HI, USA, Jun. 4-6, 2004, pp. 36-44, Piscataway, NJ, USA.

Hondroudakis, A., et al., "An Empirically Derived Framework for Classifying Parallel Program Performance Tuning Problems," Proceedings of the Sigmetrics Symposium on Parallel and Distributed Tools, SPOT 1998, Welches, OR, Aug. 3-4, 1998. Sigmetrics Symposium on Parallel and Distributed Tools, Aug. 3, 1998, pp. 112-123, vol. Symp 2, New York, NY, US, ACM.

Gara, A., et al., "Overview of the Blue Gene/L System Architecture," IBM Journal of Research & Development, Mar./May 2005, pp. 195-211, vol. 49, No. 2/3, IBM, New York, USA.

Adiga, N.R., et al., "Blue Gene/L Torus Interconnection Network." IBM Journal of Research & Development, Mar./May 2005, pp. 265-276, vol. 49, No. 2/3, IBM, New York, USA.

Barnett, M. et al., "Broadcasting on Meshes With Worm-Hole Routing," Second Revised Version, Dec. 1995, pp. 1-22, University of Texas, Department of Computer Sciences.

Faraj, A., et al. "MPI Collective Communications on the Blue Gene/P Supercomputer: Algorithms and Optimizations", $17^{th}$ IEEE Symposium on High Performance Interconnects, New York, NY, Aug. 25-27, 2009, pp. 63-72, IEEE.

Faraj, A., et al. "A Study of Process Arrival Patterns for MPI Collective Operations", International Journal of Parallel Programming, Jan. 10, 2008, pp. 1-28, Springer (Online).

Faraj, A., et al. "Automatic Generation and Tuning of MPI Collective Communication Routines", ICS'05, Jun. 20-22, 2005, pp. 393-402, Boston, MA, USA. ACM.

* cited by examiner

ESTABLISHING A GROUP OF ENDPOINTS IN A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for establishing a group of endpoints.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

In some parallel computers, each compute node may execute one or more tasks—a process of execution for a parallel application. Each tasks may include a number of endpoints. Each endpoint is a data communications endpoint that supports communications among many other endpoints and tasks. In this way, endpoints support collective operations in a parallel computer by supporting the underlying message passing responsibilities carried out during a collective operation. In some parallel computers, each compute node may execute a single tasks including a single endpoint. For example, a parallel computer that operates with the Message Passing Interface ('MPI') described below in more detail may execute a single rank on each compute node of the parallel computer. In such implementations, the terms task, endpoint, and rank are effectively synonymous.

To effect collective operations among many endpoints, a user may define various groups of endpoints. In MPI, for example, a user defines a communicator, or an operational group of ranks, within which to carry out collective operations. A user may also define a subset of the communicator—a subcommunicator—that encompasses a subset of the ranks of the communicator. Such group definitions at present, however, are tedious, time-consuming, inflexible, generally not scalable with an increasing number of endpoints, and otherwise limited.

SUMMARY OF THE INVENTION

Methods, apparatus, and products for establishing a group of endpoints configured to support collective operations in a parallel computer are disclosed in this specification. The parallel computer executes a number of tasks and each task includes a number of endpoints. In embodiments of the present invention, establishing such an endpoint group includes receiving a user specification of a set of endpoints included in a global collection of endpoints. The user specification defines the set of endpoints in accordance with a predefined virtual representation of the endpoints. The predefined virtual representation of the endpoints is a data structure setting forth a predefined organization of tasks and endpoints included in the global collection of endpoints and the user specification defines the set of endpoints without a user specification of a particular endpoint. Establishing a group of endpoints also includes defining a group of endpoints in dependence upon the predefined virtual representation of the endpoints and the user specification.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
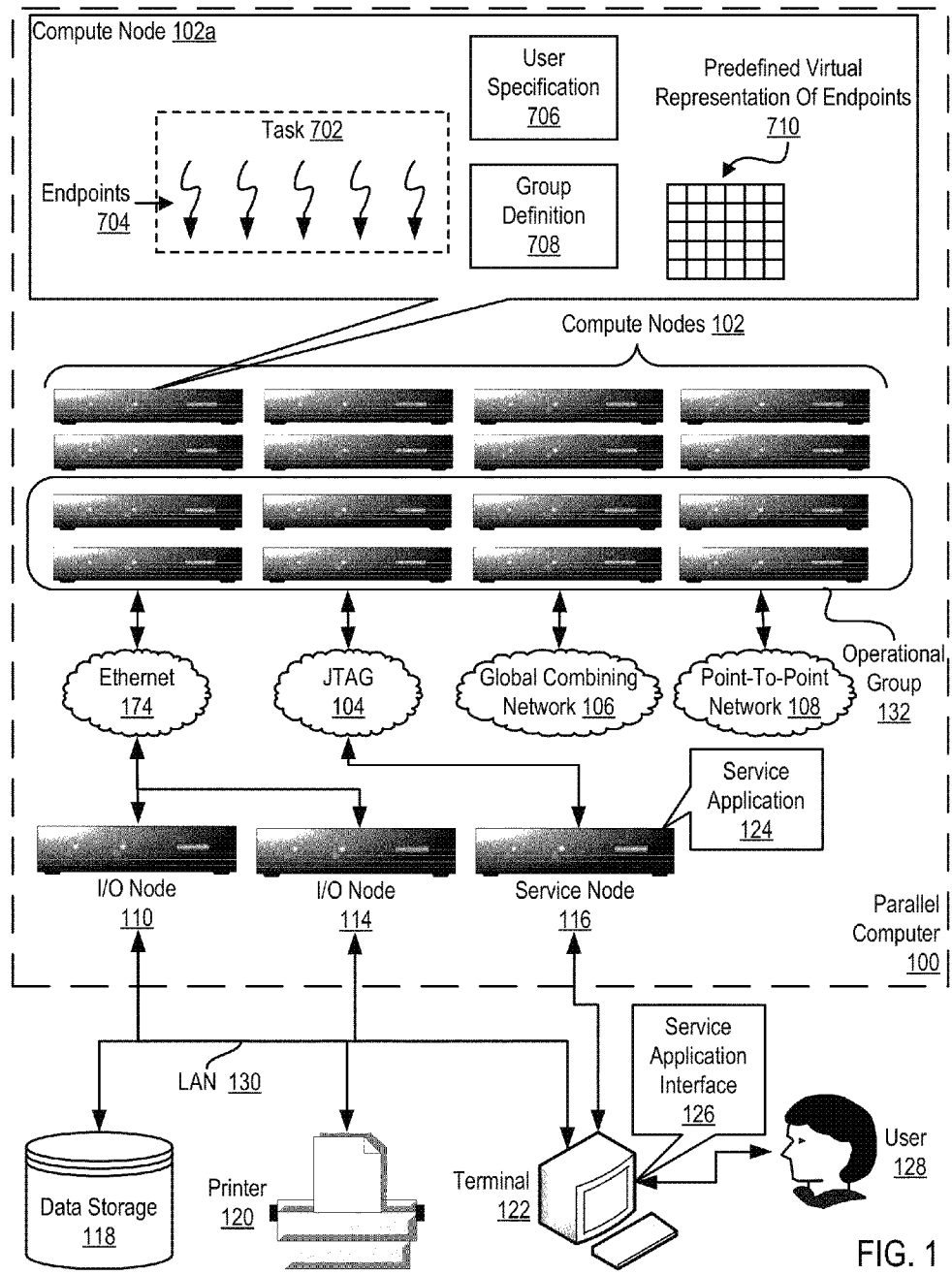
FIG. 1 illustrates an exemplary system for establishing an endpoint group according to embodiments of the present invention.

Exemplary methods, apparatus, and products for establishing a user-defined group of endpoints to support collective operations in a parallel computer in accordance with the present invention are described with reference to the accompanying drawings, beginning with FIG. 1. FIG. 1 illustrates an exemplary system for establishing an endpoint group according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.' 'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for establishing a group of endpoints configured to support collective operations in a parallel computer. In the parallel computer (100), compute node (102a) executes a task (702) that includes a number of endpoints (704). Compute node (102a) is depicted here executing such a task as an example. Readers of skill in the art will recognize that other compute nodes (102) in the parallel computer (100) of FIG. 1 may also execute a task and endpoints. Each task (702) in the example of FIG. 1 includes a number of endpoints—ranks in MPI for example. Readers of skill in the art will recognize that each compute node (102a) may execute any number of tasks and endpoints including, for example, one tasks that includes one endpoint. From time to time in this specification, a compute node will be described to operate as a rank—an instance of a single task with a single endpoint. That is, a compute node at several points in this specification is described as a single endpoint. Such a description is utilized for clarity of explanation only, not limitation.

The compute node (102a) may execute a parallel communications library—a module of computer program instructions that carry out parallel communications among endpoints (704). In supporting the establishment of a group of endpoints according to embodiments of the present invention, the library may receive a user specification (706) of a set of endpoints. The 'user' as the term is used here may refer to any of an application executing in the parallel computer or a user controlling execution of such an application as context requires.

In the example of FIG. 1, the user specification (706) defines the set of endpoints in accordance with a predefined virtual representation (710) of the endpoints without uniquely specifying a particular endpoint. A predefined virtual representation of endpoints is a data structure setting forth a predefined organization of tasks and endpoints included in the global collection of endpoints. A global collection of endpoints is a group of endpoints from which other groups may be formed. In MPI, for example, a global collection of endpoints may be implemented as MPI_COMM_WORLD—a communicator that includes all available ranks.

The predefined organization of the data structure sets forth a relationship among endpoints and tasks. These relationships, being well-known to a user, may be utilized to address or refer to one or more endpoints in the global collection. That is, a user may refer to an endpoint by its position, location, or relationship among other endpoints as set forth in the predefined organization of the virtual representation without ever utilizing the endpoint's unique identifier. The data structure forming the predefined virtual representation may be implemented in various forms, a table, a linked list, an array, a circular buffer and so on. Each element of the data structure may contain a unique identifier of an endpoint. Consider, for example, the following example table:

TABLE 1

A Predefined Virtual Representation of Endpoints

| Task_01_Endpoint_01 | Task_02_Endpoint_01 | Task_03_Endpoint_01 |
| Task_01_Endpoint_02 | Task_02_Endpoint_02 | Task_03_Endpoint_02 |
| Task_01_Endpoint_03 | Task_02_Endpoint_03 | Task_03_Endpoint_03 |

The table above sets forth an example implementation of a predefined virtual representation—a data structure setting forth a predefined organization of tasks and endpoints included in the global collection of endpoints. The example table includes three columns where each column represents a separate task—Task_01, Task_02, and Task_03. Each field in a column represents an endpoint of the task for which the column represents. Each field includes a unique endpoints identifier. In this example, each task includes three separate endpoints. A user, with knowledge of the organization set forth in the example table, may refer to endpoints in by column number, row number, or a combination of the two.

A predefined virtual representation of endpoints is 'virtual' in that an endpoint is represented, from the perspective of the user, as an element of the structure rather than by a unique identifier. A user need not be aware of the unique identifications of any endpoints included in the representation for the representation to be utilized by the user to define a group. In this way the representation may grow or shrink for varying implementations of endpoints. Consider, for example, a predefined virtual representation comprising a table of columns and rows, with each column representing a task, and each row representing endpoints of a particular rank in each task. Consider also that a user specifies as a group of endpoints, a checkerboard pattern of the table. Such a group specification may be applied to the virtual representation of endpoints regardless of which endpoints actually exist at the time of the user specification: in an implementation with ten tasks, each having ten endpoints, the checkerboard group includes fifty endpoints; in an implementation of twenty tasks, each having twenty endpoints, the checkerboard group contains two hundred tasks.

As mentioned above, the user specification (706) of a set of endpoints does not include a unique specification of any particular endpoint. In prior art, groups of endpoints are typically defined by specifying at least one particular endpoint. A group comprising a range of endpoints, for example, may be defined by specifying a first endpoint and a last endpoint—both of which must be uniquely identified. In the example of FIG. 1, the user specification need not uniquely specify a particular endpoint. The representation (710) enables a user to specify sets of endpoints solely on the structure of the representation itself, without a user having to specify a particular endpoint. Consider, again, an example representation comprising a table of columns and rows. A user may specify a set of endpoints that includes all endpoints in a first and third row, without any knowledge of the actual endpoints forming the group.

The parallel communications library, responsive to the user specification (708), may then define a group of endpoints in dependence upon the predefined virtual representation of the endpoints and the user specification. The parallel communications library may define the group by storing a record of the group of endpoints, where the record includes the unique identification of endpoint in the group. The group may then be utilized any number of times by the user to execute any number and type of collective operations.

Establishing an endpoint group according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of establishing an endpoint group according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
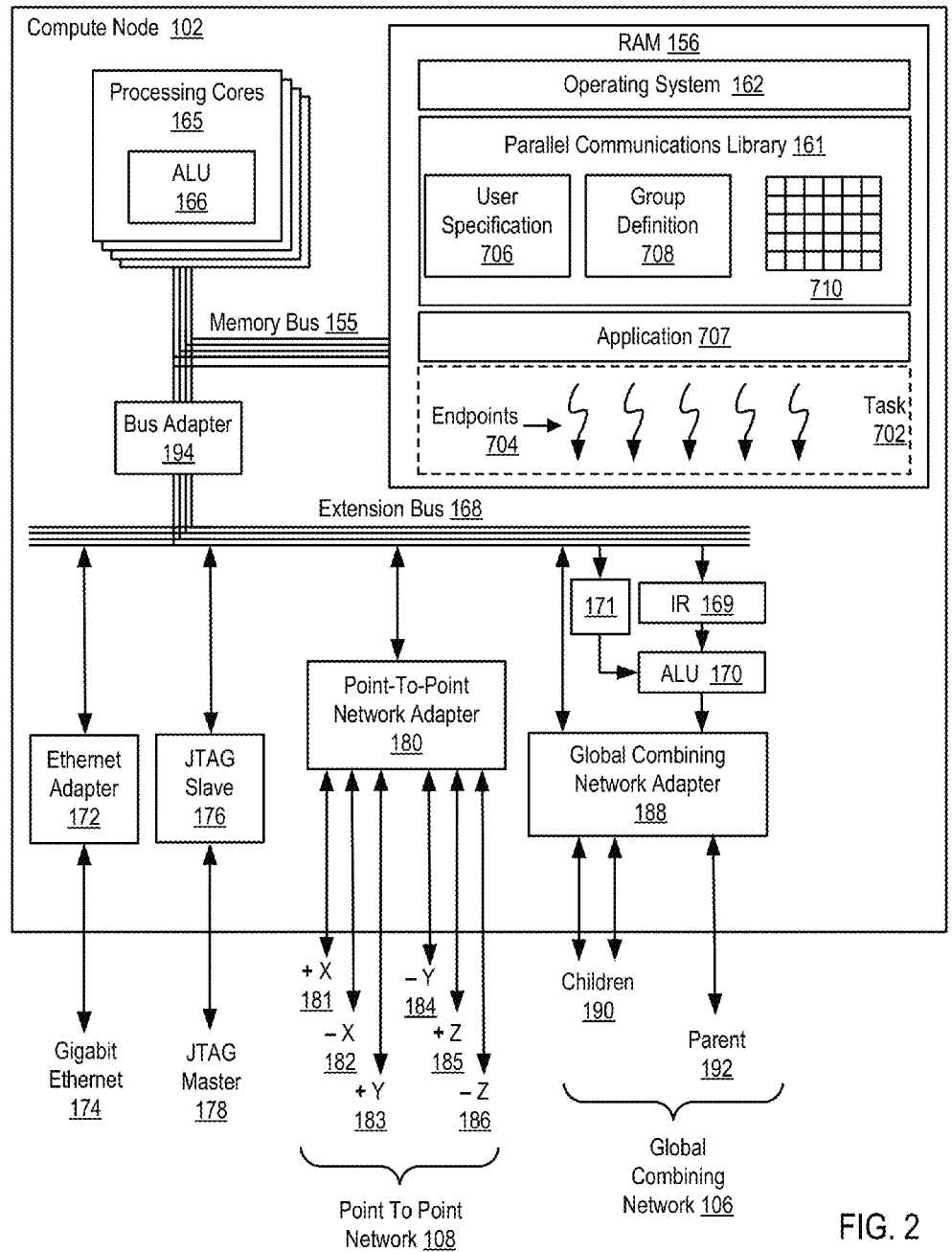
FIG. 2 sets forth a block diagram of an example compute node useful in a parallel computer capable of establishing an endpoint group according to embodiments of the present invention.

In the example of FIG. 2, the parallel communications library (161) is also configured to establish a group of endpoints (704) in accordance with embodiments of the present invention. IN the compute node (102) of FIG. 2, several endpoints (704) are included in a task (702) that supports collective operations in a parallel computer. The parallel communications library (161) in the example of FIG. 2 may receive a user specification (706) of a set of endpoints (704). In the example of FIG. 2, the user specification (706) defines the set of endpoints in accordance with a predefined virtual representation (710) of the endpoints (704) without uniquely specifying a particular endpoint. The parallel communications library (161) may then define a group of endpoints in dependence upon the predefined virtual representation of the endpoints and the user specification. The group may be used by a parallel application (707) to carry out collective operations.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for establishing an endpoint group include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for establishing an endpoint group according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
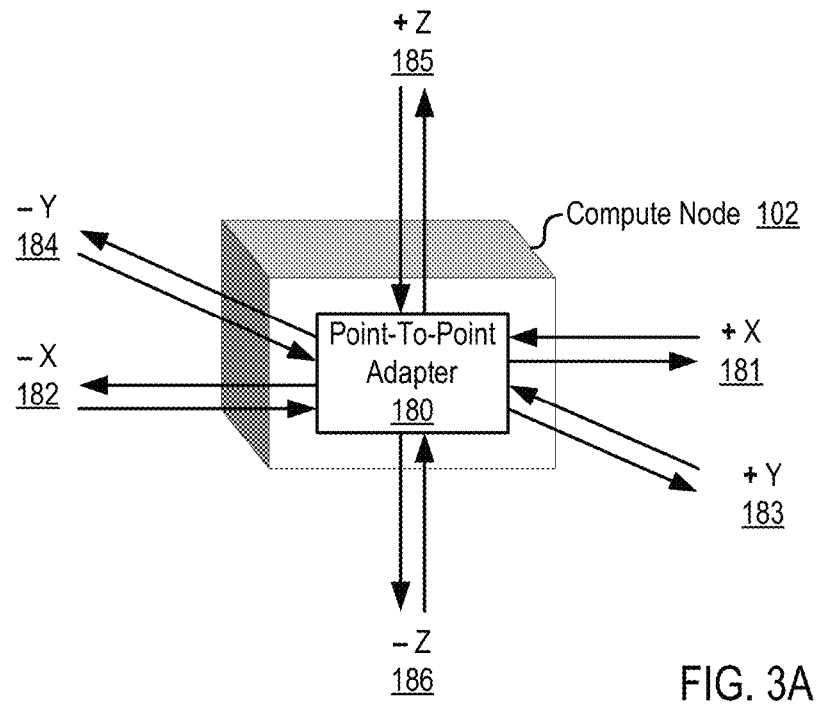
FIG. 3A sets forth a block diagram of an example Point-To-Point Adapter useful in systems for establishing an endpoint group according to embodiments of the present invention.

For further explanation, FIG. 3A sets forth a block diagram of an example Point-To-Point Adapter (180) useful in systems for establishing an endpoint group according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
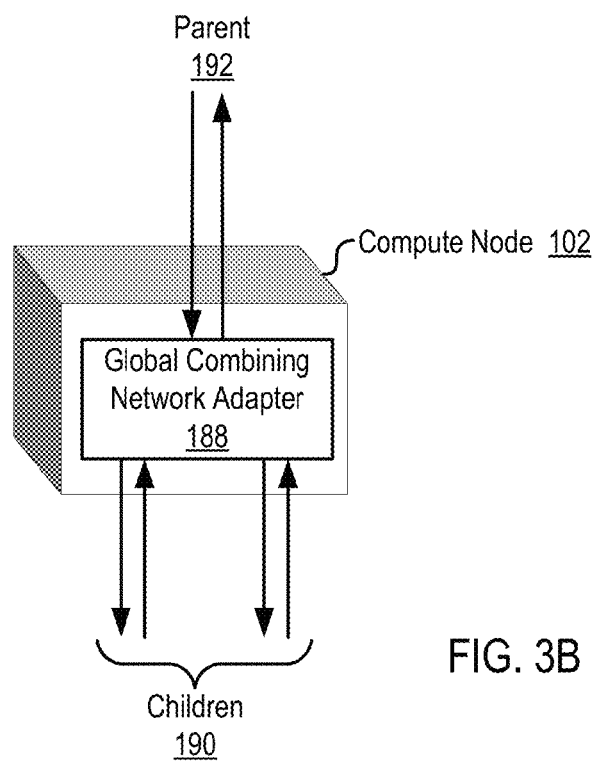
FIG. 3B sets forth a block diagram of an example Global Combining Network Adapter useful in systems for establishing an endpoint group according to embodiments of the present invention.

For further explanation, FIG. 3B sets forth a block diagram of an example Global Combining Network Adapter (188) useful in systems for establishing an endpoint group according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
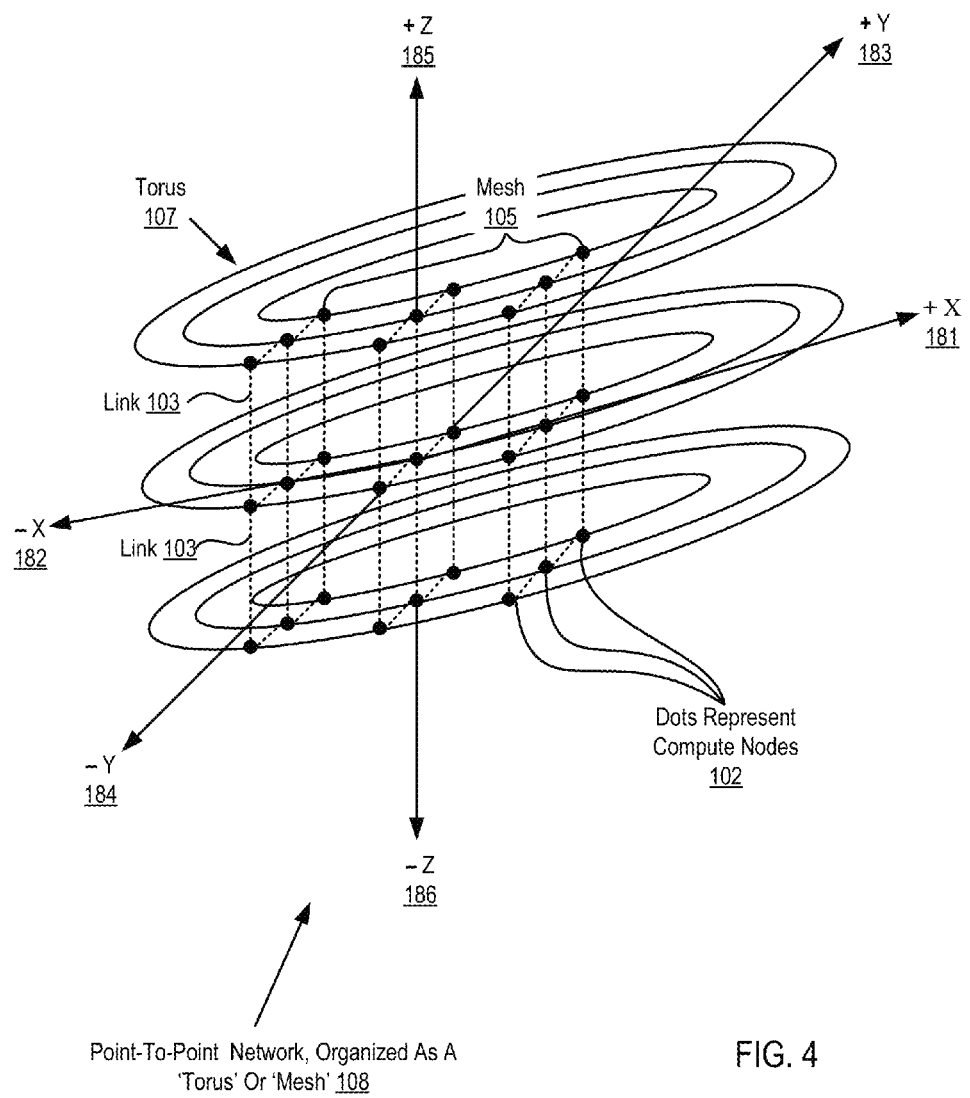
FIG. 4 sets forth a line drawing illustrating an example data communications network optimized for point-to-point operations useful in systems capable of establishing an endpoint group according to embodiments of the present invention.

For further explanation, FIG. 4 sets forth a line drawing illustrating an example data communications network (108) optimized for point-to-point operations useful in systems capable of establishing an endpoint group according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in establishing an endpoint group in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in establishing an endpoint group in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
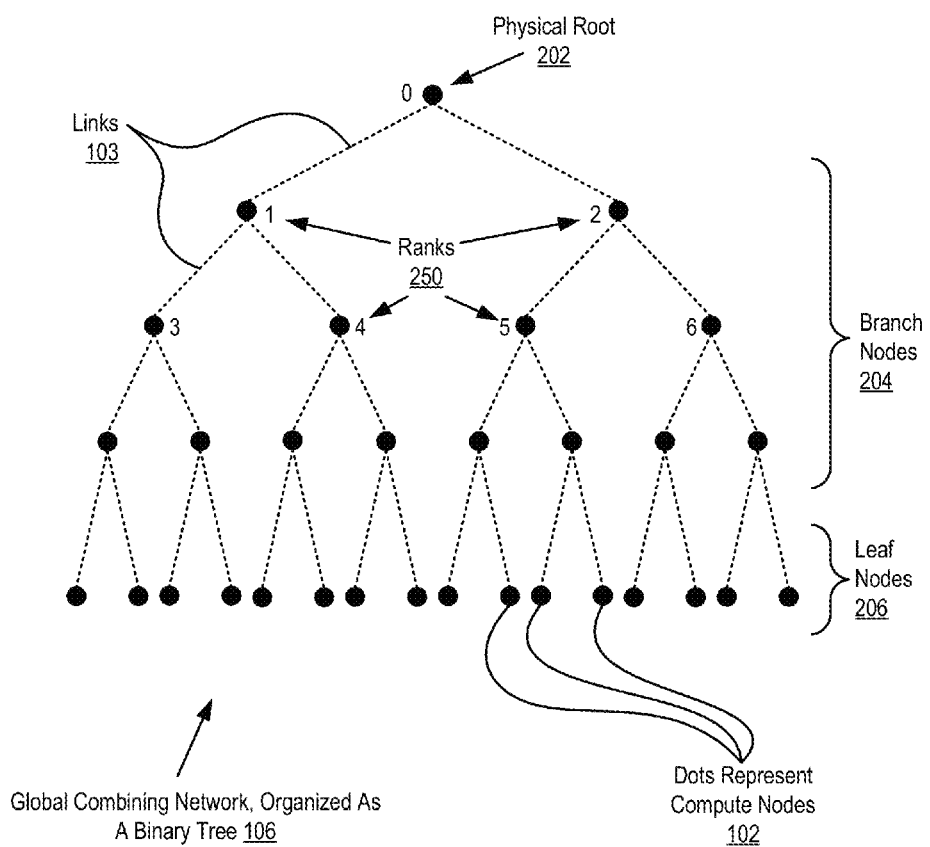
FIG. 5 sets forth a line drawing illustrating an example global combining network useful in systems capable of establishing an endpoint group according to embodiments of the present invention.

For further explanation, FIG. 5 sets forth a line drawing illustrating an example global combining network (106) useful in systems capable of establishing an endpoint group according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in establishing an endpoint group in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

As mentioned above, parallel computers and compute nodes of such parallel computers may be configured to support establishing an endpoint group in accordance with embodiments of the present invention. Embodiments of establishing such user-defined endpoint groups rely on a predefined virtual representation of endpoints. To that end, FIGS. 6A and 6B set forth a number of example implementations of a virtual representation of endpoints useful in systems that support establishing an endpoint group in accordance with embodiments of the present invention.

Figure 6A:
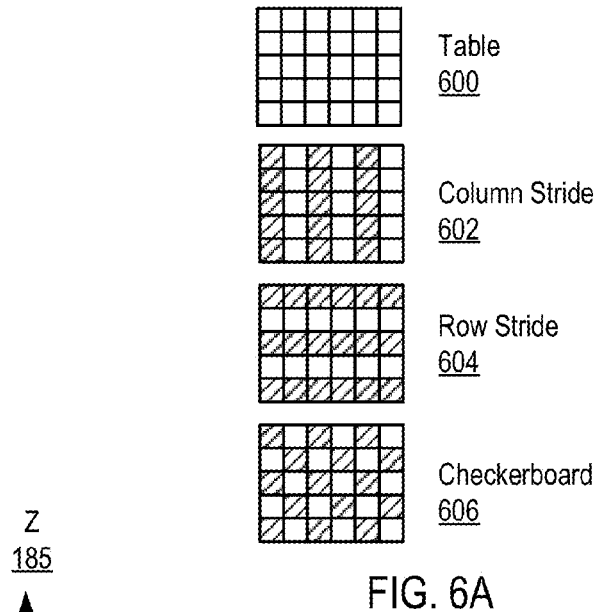
FIG. 6A sets forth a number of example implementations of a virtual representation of endpoints useful in systems that support establishing an endpoint group in accordance with embodiments of the present invention.

FIG. 6A sets forth a virtual representation of endpoints formed of a table (600) of columns and rows. Each column in the table (600) specifies a separate task. Each row in the table (600) specifies an endpoint of all tasks. Each field of a column represents a single endpoint of a task. Each subsequent field may be a subsequently ranked endpoint. Consider, for example, a task having ten endpoints, beginning at rank 0 and ending at rank 9. In such an example embodiment, the first field in the column representing the task in the table (600) represents the endpoint having a rank 0, the second field represents the endpoint having a rank 2, and so on until the tenth field represents an endpoint having a rank 9.

In some embodiments of the table (600) representation of endpoints, relationships among columns in the table (600) may be related to data communications relationships among compute nodes—the compute node executing the task represented by the column. Consider, for example, a first, second, and third compute node coupled in a point-to-point data communications link in that order where each compute node executes a single task. In such an example embodiment, the first column of the table (600) may represent the task executing on the first compute node, the second column of the table (600) may represent the task executing on the second compute node, and the third column of the table may represent the task executing on the third compute node.

Following the example table representation of endpoints are three different examples of group definitions formed in dependence upon the table's (600) structure. In the example group definitions, the shaded squares represent a field (an endpoint) in the table that is included in the group definition while all other squares represent a field of the table (600) that is not included in the group definition.

FIG. 6A includes a column stride group definition (602). The column stride group definition defines as part of the group all endpoints of a task included in alternating columns. In the example column stride group definition, all endpoints included in the first, third, and fifth columns—the first, third, and fifth tasks—are included in the group definition. The term 'alternating' as used in this specification describes at a set of columns where one column is a part of the set while an adjacent or subsequent column is not. For two columns to be considered 'alternating columns,' another single column is located between the two alternating columns. For example, in a table with a first, second, and third column, the first and third columns are alternating columns. Rows may be described as 'alternating' in the same way: for a table with five rows, the first, third, and fifth rows comprise a set of alternating rows and the second and fourth comprise a different set of alternating rows. In this example, each of the second and the fourth row is an intervening row with respect to the set of first, third, and fifth rows. Each of the first and third rows is an intervening row with respect to the second and fourth row.

FIG. 6A also includes a row stride group definition (604). The example row stride group definition (604) includes endpoints of all tasks included in alternating rows. In the example of FIG. 6A, the row stride group definition (604) includes all endpoints of first row, third row, and fifth row. Endpoints in the same row, but different columns, may be of the same rank. In such an embodiment an example row stride group definition then specifies alternating ranks of endpoints in all tasks—the first ranked endpoints of each task, the third ranked endpoint of each task, the fifth ranked endpoint of each task, and so on.

FIG. 6A also includes a checkerboard pattern group definition (606). The example checkerboard pattern group definition (606) includes for alternating columns: endpoints of alternating rows beginning at a first row in the column and for all other columns, endpoints of alternating rows beginning at a second row in the column. The example checkerboard pattern (606) of FIG. 6A includes, for each of the first, third, and fifth columns (tasks), the first, third, and fifth field (endpoint) of that column (task) and, for each of the second, fourth, and sixth columns (task), the second and fourth field (endpoint) of that column (task).

While FIG. 6A sets forth a virtual representation of endpoints as a table (600), virtual representations in accordance with embodiments of the present invention may also be implemented in accordance with other structures. To that end, FIG. 6B sets forth a virtual representation of endpoints formed of an n-dimensional matrix of endpoints (608)—more specifically, a 3-dimensional matrix. Such a representation may be implemented to correspond to a point-to-point n-dimensional data communications network in which a number of compute nodes of the parallel computer are coupled and where each compute node executes a single endpoint—such as a single rank. In this way, the structure and relationship among endpoints represented of the n-dimensional matrix corresponds to the structure and data communications relationship of the endpoints by way of the compute node upon which the endpoint executes.

Figure 6B:
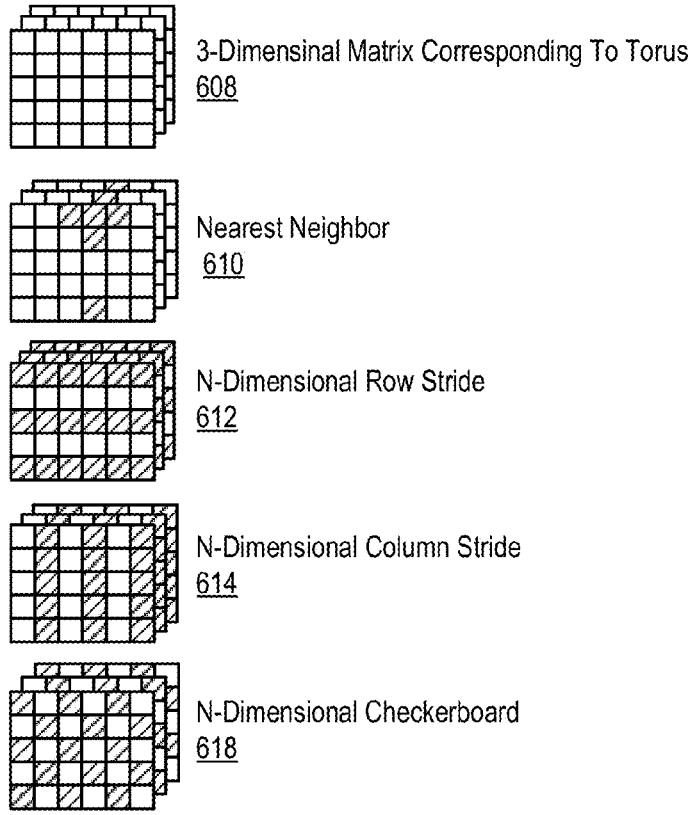
FIG. 6B sets forth a number of other example implementations of a virtual representation of endpoints useful in systems that support establishing an endpoint group in accordance with embodiments of the present invention.

In the example of FIG. 6B, the 3-dimenionsal matrix representation (608) of endpoints corresponds to a torus or mesh network of compute nodes—or said another way, each endpoint executing on those compute nodes. Such a mesh or torus network is described above in detail with respect to FIG. 4. The 3-dimensional matrix representation (608) is formed of three planes, with the first plane being depicted as the nearest plane and the third plane being depicted as the furthest plane.

Following the example 3-dimensional matrix representation (608) of endpoints are four different examples of group definitions formed in dependence upon the 3-dimensional matrix representation's (608) structure. In the example group definitions, the shaded squares represent a field (an endpoint)

in the representation (608) that is included in the group definition while all other squares represent a field of the representation (608) that is not included in the group definition.

FIG. 6B includes a group definition that includes all endpoints that form a nearest neighbor of a compute node upon which a particular endpoint is executing. In the example nearest neighbor group definition (610) of FIG. 6B, the endpoint executing on the particular compute node upon which the nearest neighbor group is defined is represented in the first (nearest) plane in the Y-direction (183), the fourth column in the X-direction (181) and the fifth row from zero in the Z-direction (the top row). As the matrix corresponds to a torus network in which a compute node in the first plane is coupled to a compute node in the third plane, and a compute node on the fifth row is coupled to a compute node on a first row, the nearest neighbors of the particular compute node are spread out among all planes of the 3-dimensional matrix.

As mentioned above and in accordance with embodiments of the present invention, a user may specify a group of endpoints without uniquely identifying a particular endpoint. Even in the 'nearest neighbor' group definition (610) of FIG. 6B, a user need not uniquely identify the particular endpoint upon which the nearest neighbor group definition is formed. Instead, a user may specify an endpoint's location within the matrix by, as one example, coordinates or offsets. In this fashion, a user may specify a group of endpoints formed of nearest neighbors of any number of particular endpoints. For example, a user may specify a group of nearest neighbors from of the first, third, and fifth ranks of alternating columns of the plane in the X dimension—all without every uniquely identifying a single compute node or endpoint by the compute node or endpoints' typical identifier.

FIG. 6B also includes an n-dimensional row stride group definition (612), an n-dimensional column stride (614) group definition, and an n-dimensional checkerboard (618) group definition—each of which is similar to that described above with respect to FIG. 6A and the table representation of endpoints (600). The n-dimensional row stride group definition (612) specifies for each and every dimensional plane, endpoints represented in alternating rows (alternating ranks of endpoints) of all columns (all tasks). The n-dimensional column stride (614) group definition specifies, for each and every dimensional plane, all endpoints of alternating columns (tasks). In the example n-dimensional column stride (614) group definition of FIG. 6B, the columns of endpoints included in the group definition are offset by one column relative to the column stride table based group definition of FIG. 6A. The n-dimensional checkerboard (618) group definition includes, for each and every dimensional plane and for alternating columns: endpoints of alternating rows beginning at a first row in the column and for all other columns, endpoints of alternating rows beginning at a second row in the column.

Figure 7:
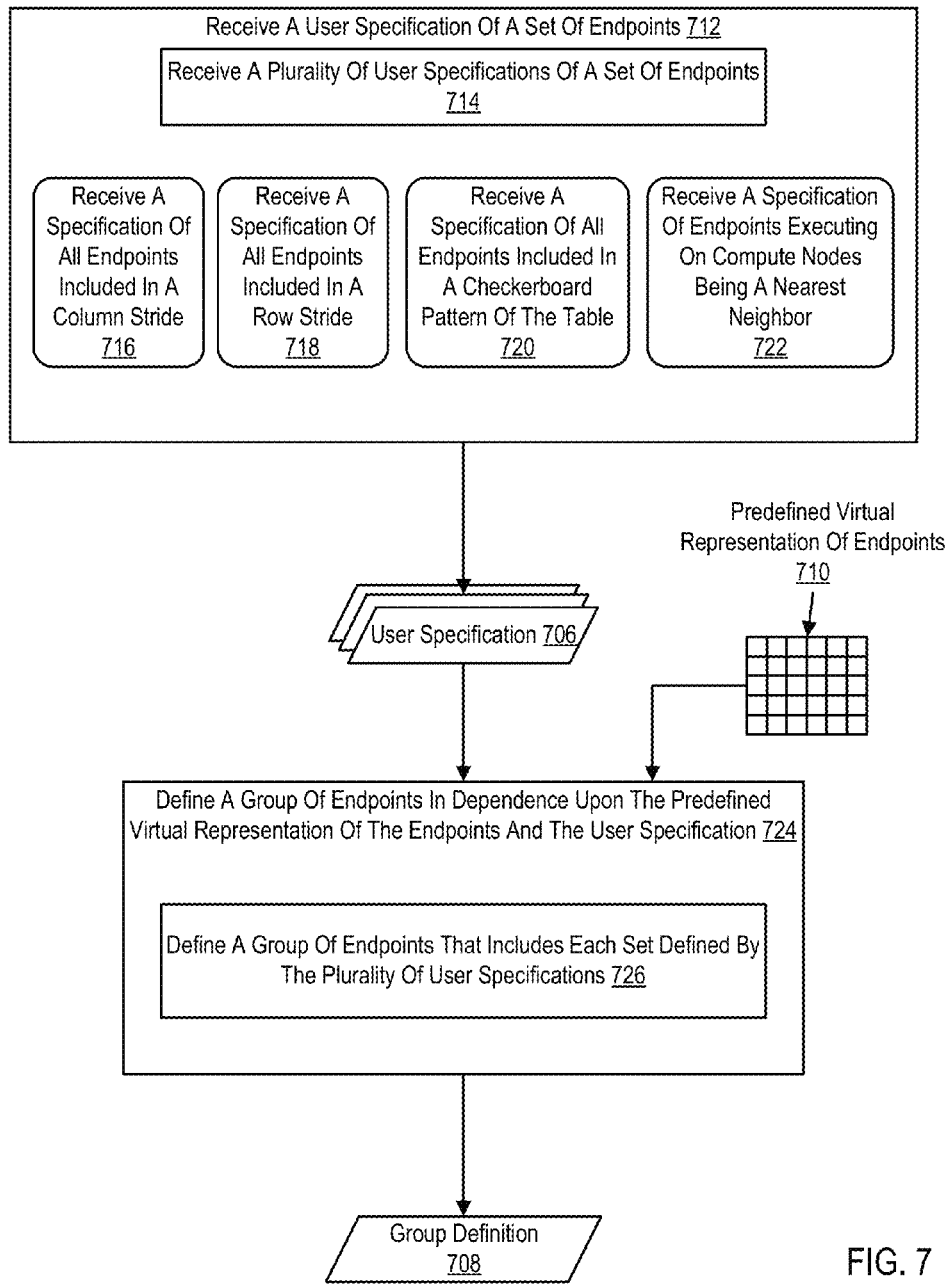
FIG. 7 sets forth a flow chart illustrating an example method for establishing an endpoint group according to embodiments of the present invention.

For further explanation, FIG. 7 sets forth a flow chart illustrating an example method for establishing an endpoint group according to embodiments of the present invention. The method of FIG. 7 may be carried out by a parallel communications library of a compute node of a parallel computer or some other module of automated computing machinery. In such a parallel computer, one or more compute nodes may each execute one or more tasks, and each task includes one or more endpoints.

The method of FIG. 7 includes receiving (712) a user specification (706) of a set of endpoints. In the example of FIG. 7, the user specification defines the set of endpoints in accordance with a predefined virtual representation (710) of the endpoints without uniquely specifying a particular endpoint. Receiving (712) a user specification (706) of a set of endpoints may be carried out in various ways including, for example, receiving, from user level application, a call to a function that provides various parameters describing the set of endpoints. The call itself may specify a type of group to define—a call to function designated to form a checkerboard pattern group, a call to function designated to form a row stride group, a call to function designated to form a column stride group, a call to function designated to form nearest neighbor group, and so on. The parameters passed in the function call may specify column offsets, field offsets, dimensional offsets, a maximum number of endpoints to include in the group, a minimum number to include in a group, a handle or name of the group for later use in by the user level application, and so on as will occur to readers of skill in the art.

In the example of FIG. 7, receiving (712) a user specification (706) of a set of endpoints includes receiving (714) a plurality of user specifications (706) of a set of endpoints. Each such specification defines a different group of endpoints in accordance with the predefined virtual representation (710) of the endpoints without uniquely specifying a particular endpoint. That is, rather than defining a group of endpoints from a single user specification, the method of FIG. 7 supports defining a group from many different user specifications. One example of multiple different user specifications includes a user specifying a group of endpoints that includes a row stride as well as a checkerboard pattern. With one or two function calls that require not unique identification of an particular endpoint, a user level application may specify a complex and power group of endpoints with data communications efficiencies based on the pattern of the endpoints in the representation and the corresponding data communication structure among the compute nodes executing the group's endpoints.

The method of FIG. 7 also includes defining (724) a group of endpoints in dependence upon the predefined virtual representation of the endpoints and the user specification. In the example of FIG. 7 defining (724) a group of endpoints in dependence upon the predefined virtual representation of the endpoints and the user specification includes defining (726) a group of endpoints comprising each set defined by the plurality of user specifications.

Defining (724) a group of endpoints may be carried out in various ways including storing in a file or other data structure a listing of each endpoint's actual unique identifier of the group. The listing may be read from time to time when the user level application specifying the group requests collective operations or other data processing to be carried out by the group.

In some embodiments of the method of FIG. 7, the predefined virtual representation of the endpoints (710) may be implemented as a table of columns and rows, with each column specifying a task, each row specifying an endpoint of all tasks. In such embodiments, receiving (712) a user specification of a set of endpoints may include receiving (716) a specification of all endpoints included in a column stride, where the column stride includes endpoints of a task included in alternating columns. Also in such embodiments, receiving (712) a user specification of a set of endpoints may include receiving (718) receiving a specification of all endpoints included in a row stride, the row stride comprising endpoints of all tasks included in alternating rows. Also in such embodiments, receiving (712) a user specification of a set of endpoints may include receiving (720) a specification of all endpoints included in a checkerboard pattern of the table. The checkerboard pattern in the example of FIG. 7 includes: for alternating columns, endpoints of alternating rows beginning at a first row in the column; and for all other columns, endpoints of alternating rows beginning at a second row in the column.

In other embodiments of the method of FIG. 7, the parallel computer includes a plurality of compute nodes coupled for data communications in a point-to-point n-dimensional data communications network and each compute node executes a single endpoint. In such embodiments, the predefined virtual representation of the endpoints (710) may be implemented as an n-dimensional matrix of endpoints, with each dimension of the matrix corresponding to a dimension of the point-to-point n-dimensional data communications network of the parallel computer. Each field of the n-dimensional matrix represents an endpoint executing on a compute node in the parallel computer. In such embodiments, receiving (722) a user specification of a set of endpoints further in the example of FIG. 7 includes receiving (722) a specification of endpoints executing on compute nodes comprising a nearest neighbor of a compute node upon which a particular endpoint is executing without uniquely identifying the particular endpoints.

In view of the description set forth above, readers will recognize that the benefits of establishing a group of endpoints according to embodiments of the present invention include:
Flexibility and thus scalability of implementations of a virtual representation of endpoints;
Reduced complexity on the part of a user specifying a complex group of endpoints;
Simplicity of defining a powerful, data communications efficient group of endpoints for collective operations and other data processing tasks; and
Others as will occur to readers of skill in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for establishing a group of endpoints configured to support collective operations in a parallel computer, the parallel computer comprising a plurality of compute nodes coupled for data communications in a point-to-point multi-dimensional data communications network, wherein each compute node executes one or more processes for execution of a parallel application, the apparatus comprising a computer processor and a computer memory operatively coupled to the computer processor, the computer memory having disposed within computer program instructions that, when executed by the computer processor, cause the apparatus to carry out the steps of:

receiving a user specification of a set of endpoints included in a global collection of endpoints, wherein each endpoint is a data communications process executing within the one or more processes that supports communications among other endpoints, each endpoint is a rank in the message passing interface (MPI), and the global collection of endpoints includes all available endpoints, the user specification defining the set of endpoints in accordance with a predefined virtual representation of the endpoints, wherein the predefined virtual representation of the endpoints comprises a data structure setting forth an organization of processes and endpoints included in the global collection of endpoints, wherein the data structure comprises a table of columns and rows, each column specifying a process, each field of the column specifying an endpoint for the process, and each row specifying an endpoint of all processes, wherein the user specification defines the set of endpoints in relation to the data structure of the predefined virtual representation and without specifying a unique identifier for any particular endpoint in the set of endpoints, and wherein the user specification comprises a specification of all endpoints included in a column stride, the column stride comprising endpoints of a process included in alternating columns;

defining, as an operational group, a group of endpoints in dependence upon the predefined virtual representation of the endpoints and the user specification; and executing one or more collective operations using the operational group defined by the group of endpoints.

2. The apparatus of claim 1 wherein:

receiving a user specification of a set of endpoints further comprises receiving a plurality of user specifications of a set of endpoints, each specification defining a different group of endpoints in accordance with the predefined virtual representation of the endpoints without uniquely specifying a particular endpoint; and defining a group of endpoints further comprises defining a group of endpoints comprising each set defined by the plurality of user specifications.

3. The apparatus of claim 2 wherein receiving a user specification of a set of endpoints further comprises receiving a specification of all endpoints included in a row stride, the row stride comprising endpoints of all tasks included in alternating rows.

4. The apparatus of claim 2 wherein receiving a user specification of a set of endpoints further comprises receiving a specification of all endpoints included in a checkerboard pattern of the table, the checkerboard pattern of the table comprising:

for alternating columns: endpoints of alternating rows beginning at a first row in the column; and for all other columns: endpoints of alternating rows beginning at a second row in the column.

5. The apparatus of claim 1 wherein the predefined virtual representation of the endpoints comprises a multi-dimensional matrix of endpoints, with each dimension of the matrix corresponding to a dimension of the point-to-point multi-dimensional data communications network of the parallel computer, with each field of the multi-dimensional matrix representing an endpoint executing on a compute node in the parallel computer.

6. The apparatus of claim 5 wherein receiving a user specification of a set of endpoints further comprises receiving a specification of endpoints executing on compute nodes comprising a nearest neighbor of a compute node upon which a particular endpoint is executing without uniquely identifying the particular endpoints.

7. The apparatus of claim 1 wherein the user specification defines at least one endpoint that does not exist.

8. A computer program product for establishing a group of endpoints configured to support collective operations in a parallel computer, the parallel computer comprising a plurality of compute nodes coupled for data communications in a point-to-point multi-dimensional data communications network, wherein each compute node executes an endpoint, the computer program product disposed upon a computer readable medium, wherein the computer readable medium is not a signal, the computer program product comprising computer program instructions that, when executed, cause a computer to carry out the steps of:

receiving a user specification of a set of endpoints included in a global collection of endpoints, wherein each endpoint is a data communications process executing within the one or more processes that supports communications among other endpoints, each endpoint is a rank in the message passing interface (MPI), and the global collection of endpoints includes all available endpoints, the user specification defining the set of endpoints in accordance with a predefined virtual representation of the endpoints, wherein the predefined virtual representation of the endpoints comprises a data structure setting forth an organization of processes and endpoints included in the global collection of endpoints, wherein the data structure comprises a table of columns and rows, each column specifying a process, each field of the column specifying an endpoint for the process, and each row specifying an endpoint of all processes, wherein the user specification defines the set of endpoints in relation to the data structure of the predefined virtual representation and without specifying a unique identifier for any particular endpoint in the set of endpoints, and wherein the user specification comprises a specification of all endpoints included in a column stride, the column stride comprising endpoints of a process included in alternating columns;

defining, as an operational group, a group of endpoints in dependence upon the predefined virtual representation of the endpoints and the user specification; and executing one or more collective operations using the operational group defined by the group of endpoints.

9. The computer program product of claim 8 wherein:

receiving a user specification of a set of endpoints further comprises receiving a plurality of user specifications of a set of endpoints, each specification defining a different group of endpoints in accordance with the predefined virtual representation of the endpoints without uniquely specifying a particular endpoint; and defining a group of endpoints further comprises defining a group of endpoints comprising each set defined by the plurality of user specifications.

10. The computer program product of claim 9 wherein receiving a user specification of a set of endpoints further comprises receiving a specification of all endpoints included in a row stride, the row stride comprising endpoints of all tasks included in alternating rows.

11. The computer program product of claim 9 wherein receiving a user specification of a set of endpoints further comprises receiving a specification of all endpoints included in a checkerboard pattern of the table, the checkerboard pattern of the table comprising:

for alternating columns: endpoints of alternating rows beginning at a first row in the column; and for all other columns: endpoints of alternating rows beginning at a second row in the column.

12. The computer program product of claim 8 wherein the predefined virtual representation of the endpoints comprises a multi-dimensional matrix of endpoints, with each dimension of the matrix corresponding to a dimension of the point-to-point multi-dimensional data communications network of the parallel computer, with each field of the multi-dimensional matrix representing an endpoint executing on a compute node in the parallel computer.

13. The computer program product of claim 12 wherein receiving a user specification of a set of endpoints further comprises receiving a specification of endpoints executing on compute nodes comprising a nearest neighbor of a compute node upon which a particular endpoint is executing without uniquely identifying the particular endpoints.

\* \* \* \* \*